United States Patent Office 2,979,289
Patented Apr. 11, 1961

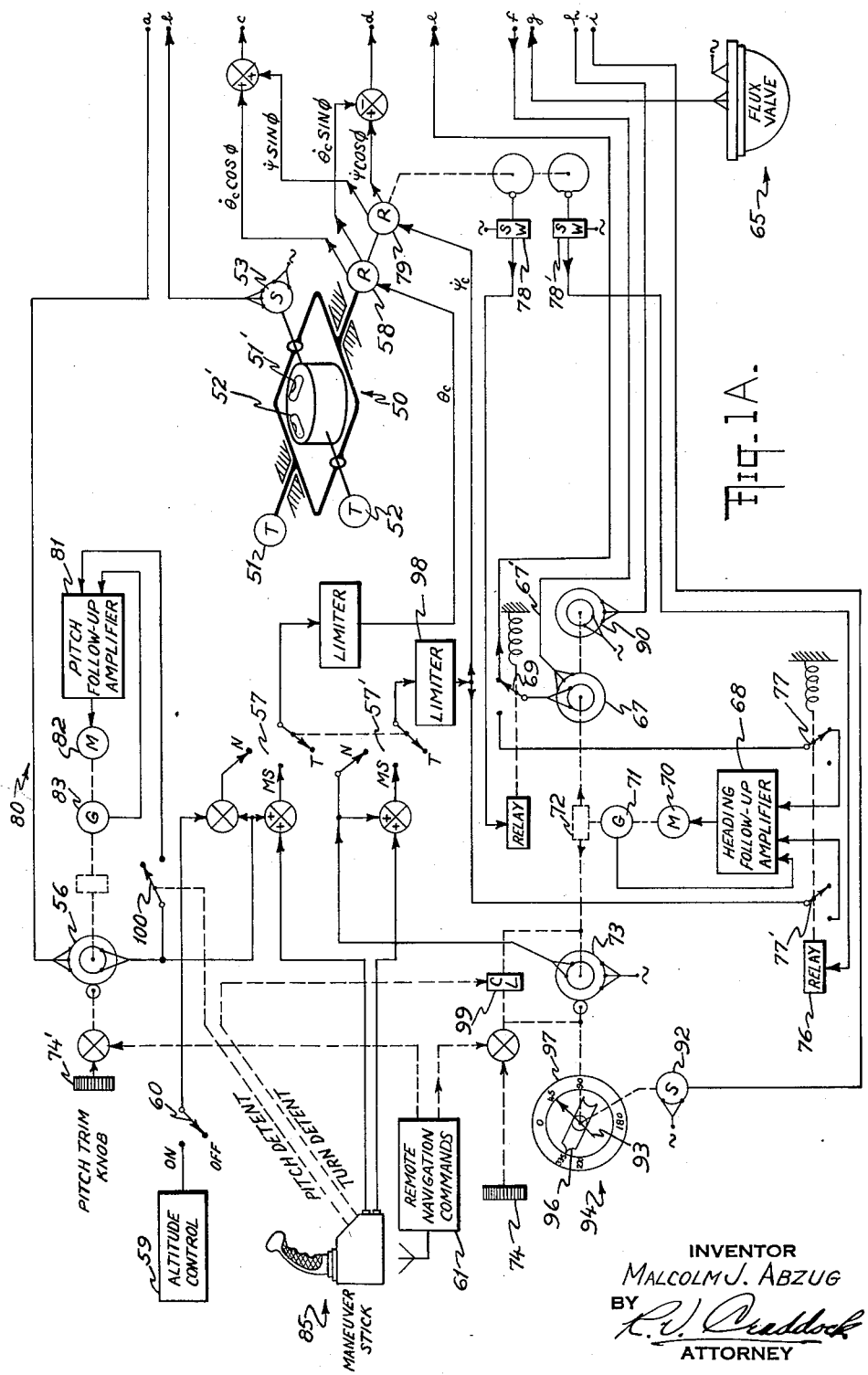

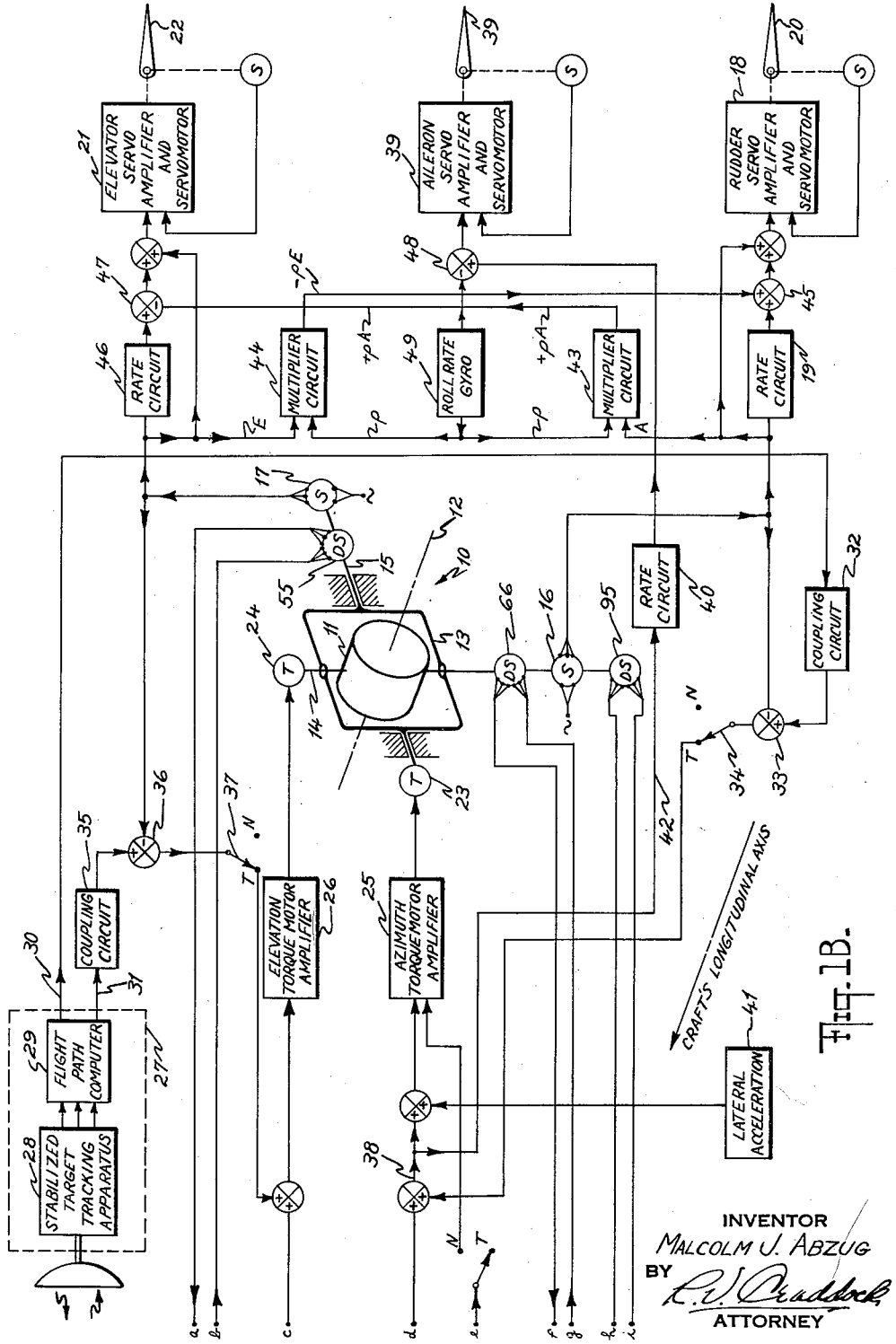

2,979,289
AUTOMATIC PILOT FOR AIRCRAFT

Malcolm J. Abzug, Pacific Palisades, Calif., assignor to Sperry Rand Corporation, a corporation of Delaware Filed Mar. 31, 1955, Ser. No. 498,352

21 Claims. (Cl. 244—77)

The present invention relates generally to automatic control systems for aircraft and more particularly to an aircraft automatic pilot for automatically controlling the course of the aircraft in accordance with a desired course defined by target-tracking apparatus carried thereby such as visual or radio tracking devices.

Although the present invention is particularly adapted to military aircraft equipped with radar tracking apparatus for tracking with airborne or ground targets and for defining, through the agency of a computer, a prescribed or computed course to be automatically followed by the aircraft in carrying out a successful attack on the tracked target, it will be understood that the invention is also applicable to any aircraft wherein it is desired to have the aircraft fly a prescribed course relative to a prescribed point or object being tracked or followed by the aircraft tracking or radar equipment. Furthermore, although in the preferred embodiment of the present invention, reference will be made to a copending application disclosing a radar-equipped fighter aircraft which is adapted to launch missiles toward another aircraft, it will be further understood that the automatic pilot of the present invention is especially adaptable to other types of aircraft and weapons, such as to larger aircraft adapted to drop bombs and the like on fixed targets or other ground-based targets which are being tracked by a visual or radio tracking apparatus carried by the aircraft.

It is therefore an object of the present invention to provide an automatic pilot for aircraft which is adapted accurately to maintain the flight path thereof coincident with the flight path prescribed by target-tracking and/or computer apparatus carried by the aircraft, that is, precisely to control the orientation of the craft's longitudinal axis in accordance with the prescribed or desired orientation defined by the target-tracking and/or computer apparatus.

In one application of the autopilot of the present invention it is important to keep the longitudinal craft axis accurately aligned with the prescribed flight path in order to successfully launch missiles or the like on a prescribed path to a target. It is especially important to maintain the longitudinal axis of the craft aligned with the prescribed course during periods when transient conditions such as wind gusts and the like act to displace the longitudinal axis of the craft from the prescribed course.

Another object of the present invention, therefore, is to provide an aircraft control apparatus or automatic pilot adapted rapidly to return the craft's longitudinal axis to the desired or prescribed orientation upon transient departures therefrom caused by gust disturbances and the like.

In order to improve the tracking accuracy of the craft in azimuth, for example, it is desirable to return the craft's longitudinal axis to the prescribed orientation by a yawing maneuver rather than by a coordinated turn maneuver. On the other hand, if the prescribed course to be flown by the aircraft changes, it is desired to turn to the new course in a coordinated maneuver.

It is, therefore, a still further object of the present invention to provide an automatic pilot for aircraft which distinguishes between changes in the orientation of the craft's longitudinal axis due to external disturbances acting on the craft and changes in the desired orientation thereof as determined by the target-tracking apparatus.

Although the autopilot of the present invention has been described above in its function of maintaining the course of the craft coincident with the course defined by tracking apparatus, it may also be employed for stabilizing the craft on a course commanded by a human pilot. For this purpose means are provided for enabling the pilot to navigate the craft as he desires. For example to navigate the craft to the attack area or after an attack on a target to navigate the craft back to its base. Furthermore, means are provided for enabling the craft to be automatically navigated as by command signals transmitted from other aircraft or from ground installations, for example.

Another object of the present invention is to provide an automatic pilot for aircraft adapted accurately to control the flight path thereof by controlling the orientation of the longitudinal craft axis in accordance with the orientation of gyroscopic means providing a reference in the aircraft representing the desired flight path.

Another object of the present invention is to provide an aircraft automatic pilot in which the craft longitudinal axis is controlled in accordance with the orientation of the spin axis of a gyroscope, changes in the flight path of the aircraft being obtained by changing the orientation of the gyroscope spin axis.

A further object of the present invention resides in the provision of an automatic control system for aircraft wherein the craft is continually stabilized throughout 360° of angular movements about all axes thereof.

Other objects and advantages of the present invention not at this time particularly enumerated will become apparent from the following description of a preferred embodiment thereof when considered in the light of the annexed drawings, wherein:

Fig. 1A illustrates schematically the manual or auxiliary control system of the automatic pilot employed during the navigation mode of operation thereof; and Fig. 1B illustrates schematically the stabilization portion of the automatic pilot together with tracking and computer apparatus which defines the desired course to be flown by the aircraft during the tracking mode of operation thereof.

The automatic pilot of the present invention is adapted automatically to control the orientation of the craft's longitudinal axis, i.e., to control the course of the craft, during two principal modes of operation, a tracking mode and a navigation mode, suitable switches and operating circuits therefor being provided under the control of the human pilot for selecting the desired mode of operation of the automatic pilot. In the following description the terms "azimuth" and "elevation" will refer to lateral and normal deviations from the craft's longitudinal axis, regardless of the orientation thereof in space, while the term "heading" and "pitch" will refer to the orientation of the craft's longitudinal axis with respect to magnetic north and to the horizon respectively.

Referring now to Fig. 1B wherein there is illustrated schematically the stabilization portion of the automatic pilot of the present invention, the primary stablization element comprises a director gyro or "X"-axis gyro which provides a space stabilized azimuth and elevation reference during the tracking mode and a stabilized heading and pitch reference during the navigation modes of operation. The director gyro is indicated generally at 10 and comprises a rotor case 11 having a rotor (not shown) suitably journalled therein for spinning about a spin axis 12. Rotor case 11 is suitably journalled in a gimbal 13 which is supported in the aircraft in a manner to provide a universal support for the rotor case 11 with freedom about the yaw and pitch axis 14 and 15 of the craft. Suitable pick-off devices 16 and 17 are provided for supplying output signals corresponding to deviations in the attitude or orientation of the craft's fore and aft axis relative to the spin axis 12 of the director gyro 10. Pick-off device 16 mounted on gimbal 13 supplies an output signal corresponding to azimuthal deviations in the orientation of the craft's axis relative to the director gyro axis while pick-off device 17 positioned by gimbal 13 provides a signal corresponding to deviations in the orientation of the craft longitudinal axis relative to the spin axis 12 of the gyro 10 in elevation.

The azimuth error signal generated at pick-off 16 is supplied to rudder servo amplifier and servomotor 18 together with a signal proportional to the rate of change thereof provided by rate-taking network 19 such that the deflection of a rudder 20 is proportional to the sum of the azimuth error and azimuth error rate signals. This derivative control of servo 18 is conventional and provides stable operation of the gyro-rudder servo loop. In the same manner, the elevation error signal generated at pick-off 17 is supplied, together with a signal proportional to the elevation error rate, to elevator servo amplifier and servomotor 21 resulting in a corresponding deflection of elevator 22 proportional to the sum of the elevation error and error rate signals. The rudder and elevator servo amplifiers and servomotors 18 and 21, respectively, as well as the aileron servo and servo amplifier may be of conventional form for the purposes of the present invention but preferably the servomotor may be of the electro-hydraulic, servo-boost type deriving their motive power from the aircraft's hydraulic supply. Such a servo-boost actuator is described in more detail in copending application Serial No. 531,317, filed August 30, 1955, in the name of Burdick et al., entitled Servo System for Controlling Dirigible Craft With Primary and Trim Tab Surfaces, which application is now U. S. Patent No. 2,864,570, dated December 16, 1958, assigned to the same assignee as the present invention. In order to provide accurate positioning of the control surfaces of the craft in accordance with the input signals to the servo amplifier, conventional surface position feedback loops are provided.

Thus, it will be seen that the orientation of the craft's longitudinal axis will be maintained accurately aligned with the orientation of the spin axis 12 of director gyro 10 and any disturbances in the orientation of the craft will be detected at pick-offs 16 and 17 resulting in corresponding surface deflections which will return the craft's orientation into coincidence with the orientation of the direction of the director gyro spin axis.

The director gyro 10 is further provided with azimuth and elevation torque motors 23 and 24, respectively, for the purpose of changing or altering the orientation of spin axis 12 in accordance with command signals supplied to azimuth and elevation torque motor amplifiers 25 and 26, respectively. Thus there is provided signal responsive means for controlling the orientation of the spin axis of the gyroscope relative to the longitudinal axis of the craft. In either the track or manual modes of operation of the automatic pilot the orientation of the craft's longitudinal axis is controlled or altered in accordance with command signals supplied to the azimuth and elevation torque motor amplifiers 25 and 26 which will precess the spin axis 12 of gyro 10, through torquers 23 and 24 in the desired direction resulting in a corresponding change in the orientation of the longitudinal axis of the aircraft. In other words, it may be said that the longitudinal axis of the aircraft is slaved to the spin axis of the director gyro. It can be seen then, that the gyro 10 operates to smooth the command inputs to the automatic pilot resulting in a very smooth but accurate operation of the aircraft in response to input command signals during both the tracking and navigation modes of operation of the automatic pilot.

Also schematically illustrated with the stabilization system of Fig. 1B is the source of command control signals used in the tracking mode of operation of the automatic pilot of the present invention, which apparatus in the illustrated embodiment, comprises tracking apparatus 27. However, in the following description of the present invention, the term "tracking apparatus" is used in its broadest sense and includes not only visual tracking devices such as telescopes, reflex sights, etc., but also radio or automatic radar tracking devices. Furthermore, this term is also considered to include computer apparatus associated with or operated by such sighting devices for computing from sight line data, e.g., target range, aircraft altitude, velocity, attitude, etc.; what the course of the aircraft should be for carrying out a successful approach and attack on a desired target. An example of such a "tracking apparatus" is disclosed in copending application Serial No. 244,761, entitled "Missile Guidance System," and filed September 1, 1951, in the name of E. B. Hammond, Jr., which application is assigned to the same assignee as the present invention. As more fully described in this copending application the means for providing azimuth and elevation error signals comprises generally an automatic tracking radar apparatus 28 and a computer 29 responsive to the orientation of the sight line for determining the desired orientation of the craft's longitudinal axis. Furthermore, since the sight line is stabilized relative to craft motions the azimuth and elevation output signals 30 and 31, respectively, are unaffected by craft motions and correspond to the desired azimuth and elevation orientation of the craft's longitudinal axis. In other words, the tracking apparatus defined above constitutes a means for providing a space-stabilized direction in space to which it is desired to slave the aircraft's fore and aft axis.

As schematically illustrated in Fig. 1B the azimuth tracking error appearing on lead 30 is applied through a suitable coupling circuit 32 to a comparison circuit 33, such as a conventional summing circuit, where it is compared with the director-gyro azimuth error signal supplied by pick-off 16. The difference between these signals is brought to the director-gyro azimuth torque motor amplifier 25 and azimuth torquer 23 through a suitable selector switch 34 operated by the pilot for placing the automatic pilot in the "track" mode of operation. In a similar manner the elevation tracking error appearing at lead 31 is applied through suitable coupling circuit 35 to summing circuit 36 where it is compared with the director-gyro error signal generated at pick-off 17, the difference being brought to the elevation torquer 24 through elevation torque motor amplifier 26 and switch 37 preferably simultaneously operated by the pilot with switch 34.

It will be noted that in order to provide a coordinated turn of the aircraft, the difference between the azimuth tracking error and the director-gyro azimuth error is also supplied to the aileron amplifier and servomotor 39 through a suitable rate-taking network 40 thereby commanding a bank of the aircraft in response to the rate of change of this difference signal to be hereinafter more fully described. In order to damp the roll motion of the aircraft a roll rate gyro 49 is employed which supplies an output signal proportional to the rate-of-roll of the aircraft. The signal to the aileron servo amplifier and servomotor 39 is the difference between the output of rate network 40 and the roll rate gyro signal. Furthermore, in the absence of a roll command signal, roll rate gyro 49 stabilizes the aircraft against disturbances causing a rolling movement thereof. In addition, a coordination control is provided comprising a lateral accelerometer 41 which supplies an output signal proportional to sideslipping or skidding of the craft during a turn. This coordination signal is supplied to the gyro azimuth precessing torquer 23 causing a corresponding precession thereof and as a consequence a correction in rudder position in a direction to remove the skid or slip.

The operation of the automatic pilot of the present invention as thus far disclosed will now be described particularly with respect to two flight conditions, i.e., under a condition in which a transient disturbance such as a lateral gust operates on the aircraft to displace the longitudinal axis thereof from the desired orientation, as determined by tracking apparatus 27 and under a condition wherein the tracking apparatus 27 commands a change in the orientation of the craft's longitudinal axis.

Assume for the moment that the longitudinal axis of the craft is oriented accurately in accordance with the flight path defined by tracking apparatus 27. Under this condition the craft's longitudinal axis will be aligned with the orientation of the gyro spin axis which in turn will likewise be aligned with the desired orientation defined by tracking apparatus 27. Now assume that a lateral gust causes a weather-cock of the aircraft thereby displacing the longitudinal craft axis from the orientation defined by gyro 10 and tracking apparatus 27. As a result of this disturbance an azimuth tracking error signal and an error at pick-off 16 of gyro 10 will be produced, since both the tracking apparatus and gyro 10 remain fixed in space. These two signals are algebraically combined at 33. Since gyro 10 and tracking apparatus 27 do define two space-stabilized azimuth directions and since the relative orientations between the spin axis 12 and the orientation defined by tracking apparatus 27 has not changed, the difference between these two signals is zero, and hence no torque will be applied to gyro torquer 23. However, the signal generated by pick-off 16 is applied to rudder servo system 18 causing a deflection of the rudder 20 and a corresponding yawing maneuver of the craft. It will be understood that the control signal to the rudder servo system 18 will be in a sense such as to reduce the control signal to zero. Furthermore, since rudder deflection is proportional to both the error and error rate the response of rudder 20 to a signal generated at pick-off 16 will be relatively high. Thus the craft's longitudinal axis will be returned rapidly to the orientation defined by gyro spin axis 12 and since its orientation in turn is defined by tracking apparatus 27 the orientation of the craft's longitudinal axis will be rapidly returned to the orientation defined thereby. Furthermore, it will be noted that the output of difference circuit 33 is zero and therefore no signal will be applied to aileron servo system 39 and hence no banking of the craft will occur during the described gust disturbance. In other words, since the azimuth command cross feed signal appearing on lead 42 is the difference between two space-stabilized azimuth directions, this signal is not sensitive to azimuth disturbances of short duration, these transient azimuth disturbances being corrected by operation of the rudder only. The above feature of the automatic pilot of the present invention provides very tight azimuth control of the craft's longitudinal axis without causing the roll axis to be sensitive to lateral gusts, a very important consideration in providing precise tracking operation and a well stabilized aircraft armament platform.

The operation of the autopilot in response to gust disturbances acting to displace the craft's longitudinal axis about its elevation axis is substantially the same as about the azimuth axis and a detailed description thereof is deemed unnecessary. Furthermore, transient disturbances acting simultaneously to displace the longitudinal axis of the craft about both the azimuth and elevation axes will be corrected by simultaneous movements of the rudder and elevator.

The operation of the automatic pilot of the present invention under the second condition described above will now be described, that is, the condition wherein the tracking apparatus 27 commands a new course to be followed by the aircraft. Under this condition the orientation defined by tracking apparatus 27 is different from that defined by the orientation of the spin axis 12 of director gyro 10 and therefore a difference signal will appear at the output of comparison circuit 33. This signal, which, as above, corresponds to the difference between the orientation of the spin axis 12 of director gyro 10 and the desired orientation defined by tracking apparatus 27 is applied to the torque motor 23 of gyro 10 through azimuth torque motor amplifier 25 thereby causing the spin axis of the gyro to precess in azimuth in accordance with the difference signal. Precession of the gyro spin axis 12 will therefore cause a signal to be generated at pick-off 16 and this signal together with its rate is applied to the rudder amplifier and servo system 18 for controlling the rudder 20 to thereby cause a corresponding yawing maneuver of the craft. At the same time, the difference signal appearing at lead 38 is applied through lead 42 to rate-taking network 40.

Therefore, network 40 will supply an output only upon a change in the difference signal appearing at lead 38. This rate signal is applied to a suitable summing circuit 48, where it is combined with the output signal from rate of roll gyro 49, the difference being supplied to actuate the aileron 39'. As stated above, the roll rate gyro 49 serves to damp the rolling motion of the aircraft. Thus, the aircraft will roll at a rate determined by roll rate gyro 49 and to an extent determined by the duration of the output signal from rate network 40, the bank angle thus established being proportional to the magnitude of the difference signal applied to torque the gyro 10. Conversely, as the difference signal diminishes the ailerons will roll the craft back to level flight. Thus the craft is caused to yaw and simultaneously to bank to thereby change the orientation of the fore and aft axis of the craft in a coordinated turn maneuver.

If any side slipping or skidding occurs, that is, if the turn is uncoordinated, accelerometer 41 will produce a signal which is applied to the azimuth torquing amplifier 25 to supply a corresponding torque signal to torquer 23 thereby causing the gyro to precess in azimuth causing a corresponding azimuth error signal at pick-off 16 and a coordinated turn back to the commanded azimuth. Thus during the above-described second operating condition the longitudinal axis of the aircraft is caused rapidly and accurately to be maintained in alignment with the spin axis 12 of gyro 10 and hence with the orientation thereof defined by tracking apparatus 27. Furthermore, inasmuch as the aileron is rendered unresponsive to lateral gust disturbances as described above the aileron gain may be made as high as desired commensurate with the aircraft configuration and aerodynamic limitations imposed thereby.

Thus it can be seen that under conditions wherein the aircraft is acted upon by gust disturbances the longitudinal axis thereof is returned quickly to the orientation desired by a yawing motion thereof while under conditions where the tracking apparatus commands a new orientation for the craft's longitudinal axis the automatic pilot of the present invention will cause the craft to perform a coordinated turn to the new desired craft axis orientation.

In connection with the tracking operation of the automatic pilot of the present invention in response to azimuth and elevation command signals from the space-stabilized tracking apparatus 27, in order to achieve tight control of the orientation of the craft's longitudinal axis, rates of the azimuth and elevation error signals in space coordinates are employed to actuate the control surfaces. These azimuth and elevation rate error signals must, of course, be expressed in terms of the angular velocities of the craft about its own axes, and the pitch, rolling, and yawing angular velocities of the craft will affect the rates of the azimuth and elevation error signals supplied to the rudder and elevator servo systems 18 and 21. Mathematical analysis has shown that the rate of change of the azimuth error ($\dot{A}$) may be represented by the following equation:

$$\dot{A} = -p \cos A \tan E - q \sin A \tan E - r \quad (1)$$

and that the rate of change of elevation error ($\dot{E}$) may be expressed by the following equation:

$$\dot{E} = p \sin 3 - q \cos A \quad (2)$$

where $p$ = craft rate of roll
$q$ = craft rate of pitch
$r$ = craft rate of yaw
$A$ = azimuth error
$E$ = elevation error These equations indicate how aircraft pitching, rolling and yawing angular velocities affect the azimuth and elevation error rate signals. From an analysis of the first equation it will be seen that the rate of azimuth error change contributed by the first term thereof depends on whether the elevation error E is positive or negative. Thus, when the fighter rolls, for any value of azimuth error A, the error rate $\dot{A}$ may reverse in sign for changes in the sign of the elevation error E. This change in sign of the azimuth error rate will act as negative damping in some cases instead of positive damping and will produce system instability. Likewise, examination of the second equation will show that the rate of elevation error change contributed by the first term thereof depends on whether the azimuth error is positive or negative, and again when the fighter rolls, for any value of elevation error E, the error rate may reverse in sign for changes in the sign of A. Again, this change in sign of the elevation error rate will act as negative damping in some cases and again will produce system instability about that particular axis. In the automatic pilot of the present invention the stability thereof is dependent upon supplying the rate signals in opposite sense to the errors themselves as the errors are being wiped out by operation of the control surfaces. Analysis of the above equations will show that the contribution of the first term in the expression for the azimuth error rate $\dot{A}$, for example, is destabilizing in the third and fourth fighter reference quadrants (the quadrants being defined in a vertical plane by the craft's vertical and lateral axes of symmetry as seen from the aircraft tail), thereby producing negative damping in these quadrants. Similarly, rates of roll can cause negative damping instead of positive damping in the opposite quadrants when using the elevation error rate signal $\dot{E}$.

As described above, the control signals for the aircraft are derived from the azimuth and elevation errors between the orientation of the fighter's longitudinal axis and the desired orientation thereof as determined by the tracking radar or tracking apparatus 27. However, since fighter roll rate introduces unstable components into the rates of changes of these error signals which are needed for proper aircraft response, corrective or compensating networks 43 and 44 have been provided. Compensating network 44 provides a corrective signal proportional to the product of the roll rate of the aircraft as measured by roll rate gyro 40 and the elevation error supplied by gyro pick-off 17. This multiplying circuit 44 is arranged to supply an output proportional to $-pE$. This negative product is supplied positively through summing circuit 45 to the output of rate network 19 of the rudder channel and serves to subtract the quantities $-pE$ from the first equation set forth above and thereby remove its effect on the rudder amplifier and servomotor system 18. Likewise, multiplier 43 is adapted to supply an output proportional to the product of the roll rate gyro 40 and the azimuth error signal supplied by pick-off 16. This positive product $+pA$ is subtracted from the elevation error rate network 46 as by difference circuit 47 and thereby remove the unstabilizing effect thereof on the servo amplifier and servomotor system 21. Since the errors themselves are always relatively small the term $(\cos A)$ may be considered as equal to 1, the term $(\tan E)$ may be considered equal to E and the term $(\sin A)$ may be considered equal to A.

Thus, in the tracking mode of operation of the automatic pilot of the present invention, tight slaving of the aircraft's fore and aft axis to the desired orientation defined by tracking apparatus 27 may be provided through the use of not only the azimuth and elevation displacement errors, but also the derivatives thereof thereby greatly increasing the response of the aircraft throughout 360° of angular maneuver thereof about all craft axes.

The navigation portions of the automatic pilot of the present invention will now be described, reference being made particularly to Fig. 1A. In the tracking mode of operation of the automatic pilot described above the director gyro spin axis 12 was slaved to the orientation defined by tracking apparatus 27, and the aircraft's longitudinal axis was in turn slaved to the spin axis 12 of the director gyro. In the navigation portion of the automatic pilot, the director gyro is again used as the stabilization element for the automatic pilot, however, the spin axis 12 of the director gyro 10 in this mode of operation is controlled by a suitable magnetic reference device for providing heading control of the aircraft and by a vertical gyro device erected to the earth's gravitational field for providing a pitch reference for the automatic pilot, changes in the orientation of the craft's longitudinal axis being commanded through the operation of suitable pilot control devices or through auxiliary command signal devices which apply precessing torques to the director gyro 10 to thereby change its orientation relative to the fore and aft craft axis. Again, as in the tracking mode, pick-off devices 16 and 17 supply azimuth and elevation control signals to the rudder and elevator servo systems 18 and 21, respectively.

For controlling the attitude of the fore and aft axis of the aircraft in pitch a vertical reference device is employed which comprises a vertical gyroscope 50 slaved to the earth's gravitational field in a conventional manner by means of pitch and roll torque motors 51, 52 energized from suitable gravity-responsive devices such as liquid level switches 51' and 52'. Mounted on the pitch axis of vertical gyro 50 is a pitch reference pick-off, such as a synchro 53 which generates a reference signal in its output windings proportional to the pitch attitude of the aircraft's longitudinal axis relative to the horizon. The output windings of the pitch reference synchro 53 are connected to the stator windings of an elevation slaving synchro 55 mounted on the elevation axis 15 of director gyro 10, the rotor of which is positioned by gyro 10 and thus supplies an output signal proportional to the difference between the orientation of the vertical gyro spin axis and the orientation of gimbal 13 in elevation as determined by the orientation of axis 12 of director gyro 10. The stator of elevation slaving synchro 55 is coupled with the stator of a suitable pitch command follow-up synchro 56 of a pitch follow-up servo loop indicated generally at 80, mounted in a suitable manual or pilot's command controller device in the pilot's compartment. Pitch follow-up loop 80 comprises a follow-up amplifier 81 which energizes follow-up motor 82 and in turn drives the rotor of synchro 56 through suitable reduction gearing, a speed generator 83 being provided for providing damping of the follow-up loop in a conventional manner. Furthermore, the stator of synchro 56 is rotatably mounted in the aircraft so that it may be positioned, as by pitch trim knob 74', for the purpose of adjusting the pitch attitude or pitch trim of the aircraft relative to gyro 50. With the selector switch 57 in either the "N" or "M.S." position the output of synchro 56 is supplied to the elevation torque motor amplifier 26 and elevation torque motor 24 on director gyro 10 through a resolver device 58, the function of which will be hereinafter more fully described. Also, if it is desired to fly at a preselected altitude or to climb and dive at a predetermined rate as determined by an altimeter, for example, a control signal is supplied from a suitable altitude control device 59, the output of which is supplied through altitude control "off-on" switch 60 to director gyro 10 when the selector switch 57 is in its "N" position. An altitude control device suitable for use in the present autopilot is fully described in copending application Serial No. 210,152 filed February 9, 1951, in the names of H. Miller and R. Love, entitled "Altitude Control for Automatic Pilots," now U.S. Patent 2,729,780 granted January 2, 1956, and assigned to the same assignee as the present application.

The automatic pilot of the present invention may be further controlled in pitch from a suitable remote or "beep" navigational command receiver 61 which may be responsive to pitch command signals transmitted from another aircraft or from ground control installations. This latter device supplies pitch command or pitch trim signals to the automatic pilot through any suitable coupling means, such as by operation of pilot's pitch trim knob 74'.

A pilot's manual stick controller 85 is also provided for supplying maneuver commands in pitch and yaw. The signal outputs from the stick controller are of a type which will produce a rate of turn and/or a rate of pitch of the aircraft through the automatic pilot proportional to the magnitude and direction of displacement thereof from its zero or neutral position. The pitch output of stick controller 85, which correspond to a desired rate of pitch of the aircraft, is applied to elevation torque motor amplifier 26 and gyro torque motor 24 with selector switch 57 in its maneuver stick or "M.S." position. As stated, this signal will produce a rate of pitch of the aircraft corresponding to the magnitude of the fore and aft deflection of the stick controller, and will produce a predetermined rate of precession of spin axis 12 of gyro 10 and a corresponding rate of pitch of the aircraft through elevation pick-off 17 and elevator servo system 21. The craft will continue its pitching motion until the stick is neutralized, at which time a craft pitch angle is established which corresponds to the duration of maneuver stick actuation. Upon displacement of maneuver stick controller 85 from its neutral position, a detent operated switch 100 is closed which supplies the output of synchro 56 to the pitch follow-up motor 81 which in turn rotates the rotor of synchro 56 to thereby maintain its output substantially zero; that is, to rotate the rotor of synchro 56 such that its position corresponds to the pitch orientation of gyro spin axis 12. When maneuver stick controller is again neutralized, the detent switch opens and any deviation from the established pitch angle will be detected at synchro 53 on gyro 50 producing an output from synchro 56 which will operate to precess gyro 10 and hence move the aircraft back to the commanded pitch angle. Thus, the aircraft will be stabilized at the pitch angle established by maneuver stick controller 85.

For controlling the orientation of the craft's longitudinal axis in yaw during the manual or automatic navigation modes or maneuver stick mode of operation of the automatic pilot of the present invention, a magnetic reference device is employed which in the illustrative embodiment takes the form of an earth inductor compass such as a flux valve generally indicated at 65 in Fig. 1A. This flux valve 65 may be of the type shown in detail in U.S. Patent No. 2,383,461 to Esval et al., assigned to the same assignee as the present invention and which operates as a synchro transmitter to supply in its output windings an electrical signal proportional to the angular orientation of the craft's longitudinal axis relative to magnetic north. The output windings of flux valve 65 are connected to the stator windings of an azimuth slaving synchro 66, the rotor of which is positioned in azimuth by director gyro 10. The output of azimuth slaving synchro 66 is supplied to the stator windings of a heading synchro 67, the output of which is applied to azimuth torquer 23 of director gyro 10. Thus, during straight and level flight the director gyro 10 acts as a slaved gyromagnetic compass system. In other words, drift in the direction of the spin axis 12 of director gyro 10 will be detected in the azimuth slaving synchro 66 and will be corrected through lead 67', heading synchro 67, torque motor amplifier 25 and torque motor 23 to precess the spin axis 12 back into correspondence with the magnetic direction established by detector 65.

If the pilot, through stick controller 85 or through a displacement of absolute heading type turn controller 74, commands a turn resulting in a turn rate below a predetermined threshold value, the output of the heading follow-up synchro 67 is applied to a heading follow-up amplifier 68 through a relay operated switch 69 actuated by a switch 78 on the roll axis of vertical gyro 50 and drives, through a switch 77, a turn follow-up motor 70 at a rate corresponding to the rate at which the aircraft is turning as detected by the changing signal from flux valve 65 supplied to synchro 67. A suitable speed generator 71 may be employed for providing a speed feedback signal for amplifier 68 such as to cause the motor 70 to drive at a rate truly proportional to the magnitude of the input signal thereto in a conventional manner. The turn command signal from the pilot's controllers 74 or 85 is also applied to gyro azimuth torquer 23 to thereby cause a precession thereof at a rate corresponding to the magnitude of this command signal which in turn causes the aircraft to turn at a corresponding rate, banking and turn coordination being provided by roll rate gyro 49 and accelerometer 41 in a manner to be described. As stated, for turns below a pretermined low rate, the output of flux valve 65 drives heading follow-up motor 70 as the aircraft turns in response to the precession of gyro 10 by the command signal. However, when the command signal is generated by rotation of the stator of synchro 73, as will be described, the motor 70 rotates the rotor thereof so that as the craft approaches the new course the output signal from the stator approaches zero. Heading follow-up motor 70 also drives a synchro transmitter 90 which supplies an output signal, through differential synchro 95 on gyro 10, to a receiver synchro 92 which, in turn, positions the pointer 93 of a heading indicator 94 to indicate to the pilot the heading of the craft. Upon completion of such a low rate turn, if there is an error in the integration of the flux valve signal, by motor 70, an output will appear in the rotor of heading synchro 67 which will be applied to the azimuth torquer 23 through reoperation of detent switch 69 to its right-hand position to thereby precess the gyro spin axis to the correct heading and a corresponding corrtctive yaw of the aircraft. The heading pointer 93 of indicator 94 will also be correspondingly positioned, through differential synchro 95 to the correct heading established by flux valve 65.

If the human pilot establishes, through controller 74 or 85, a turn rate calling for a bank angle greater than a predetermined value, say, for example, 5°, switch 78' also closes thereby actuating relay 76 which opens switch 77 and simultaneously closes switch 77'. With switch 77' closed the heading follow-up motor 70 is driven directly by the heading command signal instead of by the flux valve signal since this latter signal will be in error due to accelerations acting on the flux valve.

The human pilot may select a desired absolute heading through the heading selector knob 74 which operates to position a suitable heading selector pointer 96 relative to compass card 97. The heading command knob 74 is also connected to the stator of a synchro transmitter 73 and rotates the same relative to its rotor to produce at the output of the rotor a signal corresponding to the difference between the present craft heading and that commanded by the heading selector 74. This signal is supplied, with selector switch 57' in its "N" or "M.S." position, to resolver 79 on vertical gyro 50 and azimuth torque motor amplifier 25 to the azimuth torque motor 23 to thereby precess the spin axis 12 of gyro 10 at a rate corresponding to the magnitude thereof. As stated above, if the commanded heading requires a turn rate greater than the above predetermined threshold value, relay 76 energized by roll switch 78' will be operated throwing switch 77 to its left-hand position thereby cutting out the signal from heading synchro 67 and flux valve 65 and simultaneously throwing switch 77' to its left-hand position which places follow-up motor 70 under the control of the heading command signal. Thus, heading follow-up motor 70 will be driven at a rate corresponding to the magnitude of the signal generated at the rotor of heading command synchro 73. A limiter 98 is provided for limiting the output of the signal from synchro transmitter 73 for heading changes greater than a predetermined value to a value determined by the maximum aircraft response desired, that is, to the maximum desired precession rate of gyro 10. Of course, a similar limiter may be employed in the pitch axis for similar purposes.

It will also be noted that the heading command signal applied to torque the director gyro 10 is also applied to aileron servo amplifier and servomotor 39 causing the craft to bank to a bank angle corresponding to the magnitude of the rate of turn signal applied to gyro torquer 23 as described above in regard to the track mode of operation. It will be understood that switch 78 on the roll axis of vertical gyro 50 will be actuated when the craft begins to bank, thus operating switch 69 while switch 78' will be actuated when the bank angle attains a predetermined angle, this latter switch serving to operate relay 76 and hence operate switches 77 and 77'. As described above, a lateral accelerometer 41 detects sideslipping or skid of the craft and applies a corrective signal to the azimuth torque motor amplifier 25 and torquer 23 causing a corrective yawing of the craft through rudder 20 to restore the craft to a coordinated maneuver.

As the aircraft approaches the heading set in by heading selector knob 74 the output signal therefrom will be diminished by the follow-up action of motor 70, thereby reducing the precession rate of gyro 10 and a corresponding reduction in the rate of turn of the craft. When the aircraft is at the new heading, the output from synchro 73 will be zero and there will be no precession of gyro 10 and hence no turning of the aircraft. Furthermore, the bank will be reduced to zero and switches 78 and 78' will fall into detent and the craft will continue on the set heading at zero bank angle. Under these conditions the switch 78 forms a long term roll reference for the autopilot in either the maneuver stick or navigation modes of operation.

When the human pilot commands a change in heading of the aircraft by lateral movement of maneuver stick 85, the output signal produced by such movement will be applied to torquer 23 on gyro 10 to produce a corresponding rate of precession thereof and a corresponding rate of turn of the aircraft through rudder 20 and aileron 39. This same signal is also applied to heading follow-up motor 70. It will be noted that upon actuation of maneuver stick 85 a detent switch is actuated which energizes a clutch 99 which in turn locks the stator and rotor of synchro transmitter 73 together. Thus, follow-up motor 70 will drive both the stator and rotor of synchro 73 at a rate corresponding to the rate of turn of the aircraft in response to the command signal generated by the maneuver stick. In this manner the output of heading synchro 73 is maintained zero during operation of the autopilot through the maneuver stick. Of course, when the maneuver stick is returned to its neutral or central position laterally and the aircraft stops turning, the clutch 99 is deenergized thereby fixing the position of the stator thereof at the new heading obtained by maneuver stick operation.

At this point it should be noted that the maneuver stick position "M.S." of switches 57 and 57' could be eliminated and the output of the maneuver stick 85 could be applied directly to the navigation or "N" terminals. Alternatively, the switches 57 and 57' could be actuated from the "M.S." position to the "N" position by the same stick detents which operate the pitch follow-up motor and the clutch 99.

Command pitch and heading signals from the pilot's controllers 74, 74' and 85 and from the remote navigation command source 61 are transformed into elevation and azimuth slaving signals for the director gyro 10 by means of resolvers 58 and 79. The function of the resolvers is to convert the pitch and heading command signals which are in earth references into equivalent signals relative to the craft reference frame. The resolvers may be mounted on the roll axis of vertical gyro 50 whereby the rotors thereof are positioned in accordance with the roll angle of the aircraft. The trigonometric relations involved in the above transformation are as follows:

$$q_c = \theta_c \cos \phi + \dot{\psi}_c \sin \phi \cos \theta$$
$$\gamma_c = \dot{\psi}_c \cos \phi \cos \theta - \theta_c \sin \phi$$

where $q_c$ = elevation slaving command to torquer 24
$\gamma_c$ = azimuth slaving command to torquer 23
$\theta_c$ = pitch rate command
$\dot{\psi}_c$ = heading rate command
$\phi$ = angle of bank
$\theta$ = angle of pitch However, in the present invention the effects of craft pitch angle are not considered detrimental to the proper functioning of the automatic pilot of the present invention and the equipment has been simplified by eliminating the effect of pitch angle $\theta$ on the system operation. Approximate formulas may then be used as follows:

$$q_c = \theta_c \cos \phi + \dot{\psi}_c \sin \phi$$
$$\gamma_c = \dot{\psi}_c \cos \phi - \theta_c \sin \phi$$

Thus, the azimuth and elevation slaving rates $q_c$ and $\gamma_c$, respectively, are modified as a function of craft bank angle before being applied to the azimuth and elevation torque motor amplifiers and torque motors such that the orientation of spin axis 12 of director gyro 10 will be properly slaved with reference to the craft axes in dependence upon command signals which are reference to the earth's axes. For a more complete description of the function of resolvers 79 and 58 reference may be made to U.S. Patent No. 2,649,264, issued on October 18, 1953, to J. M. Slater et al., which patent is assigned to the same assignee as the present invention.

The operation of the automatic pilot of the present invention in the navigation mode will now be described. Assume that the craft is flying straight and level and the director gyro axis 12 drifts about its pitch axis away from the pitch reference defined by vertical gyro 50. Under these conditions an elevation slaving error signal from the slaving synchro 55 will appear at pitch command synchro 56 causing a signal to be applied to the elevation torque amplifier 26 and the elevation torque motor 24 to precess the spin axis 12 back to the original pitch angle. However, if a transient disturbance causes the longitudinal axis of the craft to pitch relative to the director gyro axis 12 a signal will be generated at pitch synchro 17 causing the elevator 22 to be deflected in a direction and to an amount such as to return the longitudinal craft axis to the orientation defined by the spin axis 12 of gyro 10. It will be noted that airplane pitch disturbances with the director gyro fixed in space would result in no elevation slaving signals being transmitted to the gyro due to the differential effect of elevation slaving synchro 55. In other words, the rotors of pitch reference synchro 53 and elevation slaving synchro 55 will move in unison resulting in no signal output from the rotor of synchro 55.

Assume now that it is desired to change the pitch trim of the craft due to changes in the load thereof, for example. This may be accomplished by adjustment of pitch trim knob 74' which rotates the stator of synchro 56 relative to its rotor thereby producing a signal corresponding to the direction and amount of said adjustment. This signal is applied to elevation torque motor 24 of director gyro 10 through switch 57 and resolver 58 thereby causing a corresponding deflection of elevator 22 and a resulting change in the pitch attitude of the aircraft. The pitch attitude will change until the output from synchro 56 is reduced to zero. In this manner, the setting of pitch trim knob 74' establishes a new pitch reference for the aircraft. The pitch attitude commanded by remote commands from 61 are also affected by rotation of the stator of pitch command synchro 56.

Assume now that it is desired to maneuver the aircraft in pitch through maneuver stick controller 85. Displacement of maneuver stick 85 from its neutral position will produce a signal corresponding to a desired pitch rate, this signal being applied, through resolver 58, to elevation torque motor 24 on director gyro 10 to produce a corresponding rate of precession thereof and again a corresponding deflection of elevator 22, resulting in a pitch of the aircraft, proportional to the magnitude of the displacement of maneuver stick 85. Upon such displacement of stick 85, detent switch 100 is closed thereby supplying the output of synchro 56, generated by pitch movement of the craft as detected by vertical gyro 50, to pitch follow-up motor 82 which motor rotates the rotor of synchro 56 at a rate corresponding to the pitching rate of the aircraft. When the aircraft is thus maneuvered to the desired pitch attitude, maneuver stick 85 is returned to its centered or neutral position thereby opening detent switch 100 and stopping follow-up motor 82 and establishing a pitch reference for the then existing pitch attitude. In other words, any further departures of the attitude of the aircraft in pitch from that established by maneuver stick 85 will be detected at synchro 56 which will supply a signal corresponding thereto to director gyro 10 causing corrective moments to be applied to the aircraft to reestablish the pitch attitude determined by synchro 56. In this way the aircraft is stabilized in pitch at all times throughout the maneuvering limits of the auto pilot in the navigation mode.

The operation of the automatic pilot of the present invention in controlling the orientation of the craft's longitudinal axis in azimuth during the navigation modes will now be described under four operating conditions: Under straight and level flight conditions, under the influence of a transient causing aircraft yawing movements, under the influence of fast rate turn commands and under the influence of slow turn rate turn commands.

During straight and level flight, i.e., during periods when no command signals operate to change the orientation of the craft's longitudinal axis from an existing heading, the operation of the automatic pilot is as follows. Assume the pilot, for example, has set in, and the craft is flying at, a desired magnetic heading as determined by heading synchro 67 and flux valve 65. If, under these conditions, the gyro spin axis 12 drifts, a signal will be generated at the azimuth slaving differential synchro 66 which signal is applied directly to azimuth torque motor amplifier 25 and azimuth torque motor 23 through switch 69 (now in its right-hand position since bank angle switch 78 is open) causing the gyro spin axis to be precessed back to the orientation called for by flux valve 65. It should be noted that the flux valve-gyro slaving servo loop has a relatively long time constant with respect to the gyro-aircraft servo loop such that the rudder servo system 18 does not respond to the slow drift of director gyro 10, that is, such that slaving of director gyro spin axis to the flux valve orientation does not result in operation of rudder servo system 18.

If during any flight condition a transient such as a lateral wind gust causes a yawing or weather-vaning movement of the aircraft, a signal will be generated at pick-off 16 and supplied to rudder servo system 18 causing a deflection of rudder 20 to counteract the yawing disturbance. These yaw transients are rapidly corrected by rudder action only just as during the tracking mode of operation of the automatic pilot described above. However, it will be noted that during the navigation mode airplane heading disturbances with the gyro spin axis fixed in space will result in no azimuth slaving signals being transmitted to precess spin axis of the director gyro 10 due to the operation of differential synchro 66.

Assume now that it is desired to change the flight path of the aircraft by changing the orientation of the longitudinal axis thereof and that the commanded change is produced by operation of the pilot's maneuver stick 85. As described above, this maneuver stick is of the type which commands a rate of turn of the craft proportional to the magnitude of the displacement of the maneuver stick from its neutral or zero position. The signal produced at maneuver stick 85 is applied through selector switch 57' and resolver 79 to the azimuth torque motor amplifier 25 and torquer 23 to cause a rate of precession of the gyro spin axis corresponding to the magnitude and direction of the maneuver stick displacement. This same signal is applied to aileron servo system 39 through a rate circuit 40, thereby displacing the ailerons and causing a rate of roll corresponding to the rate of change of the turn command signal. The roll rate gyro 49 responds to resulting aircraft motion about the roll axis thereof and stabilizes the aircraft in roll at the commanded bank angle. Since the error signal to aileron servo system 39 is proportional to the rate of change of the heading command signal the aircraft rolls through an angle corresponding to the angular displacement of the maneuver stick. Also, since the signal to the azimuth torque motor 23 of gyro 10 is proportional to the displacement of the manual stick controller 85, the gyro continues to precess as long as the error signal exists. Such precession of the gyro spin axis will cause a signal to be generated at pickoff 16 which is applied to the rudder servo system 18 to cause the aircraft to yaw at a rate corresponding to the magnitude of the command signal. Thus, it will be seen that the aircraft heading changes in a coordinated turn maneuver. Should there be any side slipping or skidding during the turn, the accelerometer 41 will produce a signal which is applied to the gyro azimuth torquer 23 in a direction and amount to produce a corrective rudder action which will eliminate side slip or skid.

As the aircraft rolls in response to the command signal, resolvers 58 and 79 proportion the turn command signal between the elevation torque motor 24 and the azimuth torque motor 23 in accordance with the bank angle of the craft in a manner similar to that described in the above-mentioned Slater patent. Simultaneously, switch 78 on the roll axis of the vertical gyro 50 closes and removes the flux valve signal from control of the spin axis of gyro 10 and for low rate turns this flux valve signal is applied to operate heading follow-up motor 70. During low rate turns, then, flux valve data are considered sufficiently accurate to control heading follow-up motor 70. However, when the bank angle of the craft reaches a predetermined threshold value, for example, 5°, switch 78' closes and relay 76 operates switches 77 and 77' thereby removing the flux valve signal from the heading follow-up motor 70 and replacing it with the command rate of turn signal. Thus, switch 78', responsive to a predetermined bank angle of the craft, and therefore responsive to a predetermined turning rate of the craft, functions to cut out the flux valve signal from control of heading follow-up motor 70, which signal is in error due to acceleration forces acting on its pendulous mass during a turn at a rate greater than a predetermined value. With switch 77' in its left-hand position the signal from manual stick controller 85, which in effect corresponds to the rate of turn of the craft, is applied to heading follow-up amplifier 68 to thereby cause heading follow-up motor to drive at a rate corresponding to the magnitude and direction of this heading command signal. Furthermore, under maneuver stick control, detent operated clutch 99 connects the rotor and stator of synchro 73 together such that as follow-up motor 70 rotates under the influence of the maneuver stick signal, the output of synchro 73 is maintained zero as described above.

When it is desired to stop the heading change, manual stick controller 85 is recentered or neutralized thereby removing the torque from director gyro torquer 23 and arresting the precession of the spin axis thereof. At the same time a signal corresponding to the rate of change of the displacement signal from its displaced position to its zero position is applied to the aileron servo system 39 thereby removing the bank angle of the craft. Also as the craft returns to level flight, switch 78' will deenergize relay 76 and switches 77 and 77' will be operated to their right-hand positions under the influence of a suitable biasing spring. Switch 78 will also return switch 69 to its right-hand position placing gyro 10 under control of flux valve 65 and clutch 99 will be deenergized and the stator of synchro 73 will be released from its rotor at a position corresponding to the newly attained heading.

In selecting a desired new heading using the heading type turn control, the pilot rotates heading command knob 74 until the desired heading is indicated by heading selector pointer 96 on compass card 97. Such rotation of knob 74 rotates the stator of synchro 73 causing a signal to be produced therein, which signal is applied through limiter 98 to resolver 79, azimuth torque motor amplifier 25, and torque motor 23 to precess the gyro in the same manner as that when the manual maneuver stick 85 is operated. Limiter 98 insures that no matter how fast or through what angle the pilot turns the heading selector knob 74, the magnitude of the signal applied to the director gyro torquer will be limited to a predetermined value and remain at that value until the new heading is approached. As the craft approaches the selected heading, the signal from the heading command receiver synchro will gradually be reduced toward zero by operation of heading follow-up motor 70 and when the craft has attained the new heading this signal will be reduced to zero thereby arresting the precession of director gyro 10 and returning the craft to level flight at the new heading as set forth above.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control system for aircraft having roll and yaw control surfaces for controlling the azimuthal orientation of the longitudinal axis of said aircraft and including stabilized apparatus for defining a first space-stabilized azimuthal reference direction, automatic pilot means for said aircraft comprising, gyroscope means for defining a second space-stabilized azimuthal reference direction, means responsive to the azimuthal orientation of said gyroscope for controlling said yaw control surface whereby to control the orientation of said craft longitudinal axis in accordance with the orientation of said gyroscope, and means responsive to the difference between the orientation of said gyroscope and the orientation of said apparatus for controlling said gyroscope orientation and said roll control surface.

2. In a control system for aircraft having stabilized apparatus for defining a first space-stabilized azimuthal reference direction and having roll and yaw control surfaces for controlling the azimuthal orientation of the longitudinal axis of said aircraft, automatic pilot means for said aircraft comprising, gyroscope means for defining a second space-stabilized azimuthal reference direction, means responsive to the azimuthal orientation of said gyroscope for controlling said yaw control surfaces, means responsive to the difference between the azimuthal orientation of said gyroscope and the azimuthal orientation of said apparatus for controlling the azimuthal orientation of said gyroscope, and means responsive to said last-mentioned means for additionally controlling said roll control surface.

3. An automatic pilot for aircraft having control surfaces for controlling the orientation of the longitudinal axis thereof in accordance with a desired orientation thereof as determined by space-stabilized apparatus carried by said aircraft comprising, gyroscope means for defining a reference axis normally parallel to said craft longitudinal axis, means for comparing the orientation of said gyroscope reference axis with the orientation of said craft longitudinal axis for providing a first signal corresponding to the difference therebetween, means for comparing said desired orientation with said difference between the orientations of said gyroscope reference axis and said craft longitudinal axis for providing a second signal corresponding to the difference therebetween, means for controlling said control surfaces in accordance with said first signal, and means for controlling the orientation of said gyroscope reference axis in accordance with said second signal whereby said autopilot distinguishes between changes in the orientation of said craft longitudinal axis due to external disturbances acting on said craft and changes in the desired orientation thereof as determined by said space-stabilized apparatus.

4. An automatic pilot for an aircraft having roll and yaw control surfaces for controlling the azimuthal orientation of the longitudinal axis thereof and a stabilized tracking apparatus for defining a first space stabilized directive axis, said automatic pilot comprising, gyroscope means for defining a second space stabilized directive axis, means for comparing the azimuthal orientation of said gyroscope-defined axis with the azimuthal orientation of said craft longitudinal axis for providing a first signal corresponding to the difference therebetween, means for comparing the azimuthal orientation of the directive axis of said tracking apparatus with said difference between the azimuthal orientations of said gyroscope-defined axis and said craft longitudinal axis for providing a second signal corresponding to the difference therebetween, means for controlling said yaw control surface in accordance with said first signal, and means for controlling said gyroscope means and said roll control surface in accordance with said second signal whereby changes in the azimuthal orientation of said craft longitudinal axis due to external disturbances are corrected by operation of said yaw control surface and desired changes in the azimuthal orientation of said longitudinal axis are obtained by operation of both said roll control surface and said yaw control surface.

5. An automatic pilot as set forth in claim 4 further including turn coordination means comprising means responsive to lateral accelerations of said craft and means responsive thereto for further controlling said gyroscope means whereby to further control said yaw control surface in a direction and to an amount to eliminate said acceleration.

6. An automatic pilot for aircraft having roll and yaw control surfaces for controlling the azimuthal orientation of the longitudinal axis thereof in accordance with a desired azimuthal orientation comprising, means defining said desired azimuthal orientation, gyroscope means for defining a reference axis normally parallel to said craft longitudinal axis, means for comparing the azimuthal orientation of said gyro reference axis with the azimuthal orientation of said craft longitudinal axis and for providing a first signal corresponding to the difference therebetween, means for comparing said desired azimuthal orientation with said difference between the azimuthal orientations of said gyroscope reference axis and said craft longitudinal axis and for providing a second signal corresponding to the difference therebetween, means for controlling said yaw control surface in accordance with said first signal, means for controlling the azimuthal orientation of said gyroscope reference axis in accordance with said second signal, and means for further supplying said second signal to said roll control surface whereby changes in the azimuthal orientation of said craft longitudinal axis in the absence of changes in said desired azimuthal orientation are corrected by operation of said yaw control surface and changes in the desired orientation of said craft longitudinal axis are controlled by operation of both said yaw and roll control surfaces.

7. An automatic pilot as set forth in claim 6 further including turn coordination means comprising means responsive to lateral accelerations of said craft and means responsive thereto for further controlling said gyroscope reference axis whereby to further control said yaw control surface in a direction and to an amount to eliminate said acceleration.

8. An automatic pilot for aircraft having roll and yaw control surfaces and actuating means therefor for controlling the azimuthal orientation of the longitudinal axis thereof, gyroscopic means for defining a reference axis normally parallel to said craft longitudinal axis, means for controlling the azimuthal orientation of said gyroscopic axis, means for providing an azimuth command signal corresponding to a desired azimuthal orientation of said craft axis, means for supplying said command signal to said gyroscope control means whereby to cause the azimuthal orientation of said gyroscope axis to move relative to said craft axis, pick-off means coupled with said gyroscope means for providing error signals corresponding to the difference between the orientations of said gyroscope axis and said craft axis, means for supplying said error signal to said yaw surface actuating means whereby said craft axis is caused to follow the azimuthal orientation of said gyro axis, means for supplying said command signal to said roll surface actuating means whereby to cause said craft to roll substantially simultaneously with yawing thereof, means responsive to lateral accelerations of said craft and for providing a signal corresponding thereto, and means for supplying said acceleration signal to said gyroscope control means whereby additionally to control the yawing of said craft in a manner to reduce said acceleration signal to zero and thereby coordinate the craft maneuver.

9. An automatic pilot for an aircraft having control surfaces and operating means therefor for controlling the orientation of the longitudinal axis thereof and a space stabilized target-tracking apparatus for defining a first space stabilized axis corresponding to a desired orientation of said aircraft, said autopilot comprising, means responsive to the operation of said target-tracking apparatus for providing a first signal corresponding to said desired orientation of the longitudinal axis of said craft, gyroscope means for defining a second space reference axis normally parallel to said craft longitudinal axis and including means for controlling the orientation thereof, signal generating means coupled with said gyroscope for providing a second signal corersponding to the difference between the orientation of said gyroscope reference axis and the orientation of said craft longitudinal axis, means responsive to said first and second signals for providing a third signal corresponding to the difference therebetween, means for supplying said second signal to said control surface operating means, and means for supplying said third signal to said gyroscope control means whereby said autopilot distinguishes between changes in the orientation of said craft longitudinal axis due to external disturbances acting on said craft and changes in the desired orientation thereof as determined by said target-tracking apparatus.

10. An automatic pilot for an aircraft having roll and yaw control surfaces and actuating means therefor for controlling orientation of the longitudinal axis thereof and stabilized tracking apparatus for defining a first space reference axis corresponding to a desired orientation of said aircraft, said automatic pilot comprising, means responsive to said tracking apparatus for supplying a first signal corresponding to said desired orientation of said craft longitudinal axis, gyroscope means for defining a second space reference axis normally parallel to said craft longitudinal axis and including means for controlling the orientation thereof, signal generating means coupled with said gyroscope means for supplying a second signal corresponding to the difference between the orientation of said gyro reference axis and the orientation of said craft longitudinal axis, means responsive to said first and second signals for supplying a third signal corresponding to the difference therebetween, means for supplying said second signal to said yaw control surface, means for supplying said third signal to said gyroscope controlling means, and means for additionally supplying said third signal to said roll control surface actuating means whereby changes in the azimuthal orientation of said craft longitudinal axis in the absence of changes in said desired azimuthal orientation thereof are corrected by operation of said yaw control surface and changes in the desired orientation of said craft longitudinal axis are controlled by operation of both said yaw and roll control surface.

11. An automatic pilot as set forth in claim 10 further including an accelerometer responsive to lateral accelerations of said aircraft for supplying a signal corresponding thereto, and means for supplying said acceleration signal to said gyroscope control means whereby to further control said yaw control surface in a sense and to an amount to eliminate said acceleration signal.

12. An automatic pilot system for aircraft having control surfaces for controlling the orientation of the craft's longitudinal axis comprising a free gyroscope supported in said craft such that its spin axis is normally substantially parallel to said craft axis, a servo loop coupling said surfaces with said gyro for maintaining said craft axis substantially parallel with said gyro spin axis, precessing means for controlling the orientation of said gyro spin axis, a magnetic device for providing a heading reference through interaction with the earth's magnetic field, means responsive to said magnetic device for producing a reference signal corresponding to the orientation of said magnetic device in said field relative to the orientation of said craft axis, follow-up means coupled with said signal producing means and responsive to the signal produced thereby for controlling said follow-up means in a sense to reduce said reference signal toward zero, and means responsive to the operation of said follow-up means for supplying a further signal to said gyro precessing means whereby to control said gyro orientation in accordance with the operation of said follow-up means and thereby to control the craft orientation in accordance with the orientation of said magnetic device.

13. An automatic pilot system for aircraft having control surfaces for controlling the orientation of the craft's longitudinal axis comprising a free gyroscope supported in said craft such that its spin axis is normally substantially parallel to said craft axis, a servo loop coupling said surfaces with said gyro for maintaining said craft axis substantially parallel with said gyro spin axis, precessing means for controlling the orientation of said gyro spin axis, a magnetic device for providing a heading reference through interaction with the earth's magnetic field, means responsive to said magnetic device for producing a reference signal corresponding to the orientation of said magnetic device in said field relative to the orientation of said craft axis, follow-up means coupled with said reference signal producing means and responsive to the signal produced thereby for controlling said follow-up means in a manner to reduce said reference signal toward zero, means coupled with said follow-up means for producing a command signal proportional to a desired change in the orientation of said craft axis, means for supplying said command signal to said gyro precessing means whereby to change the orientation of said gyro spin axis and thereby a corresponding change in the orientation of said craft axis through said servo loop, and means responsive to the resultant change in the craft's orientation for removing the reference signal controlling said follow-up device and simultaneously substituting said command signal therefor whereby to control said follow-up in accordance with said command signal.

14. An automatic pilot for aircraft of the character set forth in claim 13 wherein said servo loop includes means responsive to said command signal for producing a corresponding craft bank angle and wherein the means responsive to the change in the craft's orientation for substituting said command signal for said reference signal comprises means responsive to said craft bank angle.

15. An automatic pilot system for aircraft having control surfaces for controlling the orientation of the craft's longitudinal axis comprising a free gyroscope supported in said craft such that a spin axis is normally substantially parallel to said craft axis, a servo loop coupling said surfaces with said gyro for maintaining the craft axis substantially parallel with said gyro spin axis, precessing means for controlling the orientation of said gyro spin axis, a magnetic device for providing a heading reference through interaction with the earth's magnetic field, means responsive to said magnetic device for producing a reference signal corresponding to the orientation of said magnetic device in said field relative to the orientation of said craft axis, a follow-up motor coupled with said signal producing means and responsive to said reference signal for driving said follow-up motor in a manner to reduce the signal produced thereby toward zero, means coupled with said follow-up motor for producing a command signal proportional to a desired rate of turn of said craft axis, means for supplying said command signal to said gyro precessing means whereby to precess said gyro spin axis at a rate corresponding to said command signal and thereby to produce a corresponding rate of turn of said craft axis through said servo loop, and means responsive to said craft rate of turn for removing said reference signal from said follow-up device and for simultaneously substituting said command signal therefor whereby to control the rate of operation of said follow-up motor in accordance with said command signal.

16. A heading reference system for an aircraft automatic pilot wherein the orientation of the craft longitudinal axis is maintained in a predetermined angular orientation with respect to the spin axis of a free gyroscope through a first servo loop coupling the craft control surfaces with said gyroscope and wherein said gyroscope is provided with means for precessing the spin axis thereof whereby to change its orientation in space, said system comprising a magnetic reference device sensitive to the earth's magnetic field, means coupled with said magnetic reference device for producing a reference signal corresponding to the orientation of said magnetic device in said field relative to the orientation of said craft axis, a second servo loop responsive to said reference signal and coupled with said signal producing means for reducing said reference signal toward zero, turn command means coupled with the output of said second servo loop for supplying a command signal corresponding to a desired change of heading of said craft, means for supplying said command signal to said gyro precessing means whereby to change the orientation of said craft axis in heading through said first servo loop, and means responsive to the resultant turning of said craft for rendering said second servo loop responsive to said command signal.

17. A gyromagnetic compass system, a magnetic device for providing an azimuth reference through interaction with the earth's magnetic field, a free gyro having means for precessing the same whereby to change its orientation, a signal generating means coupled with said gyro and responsive to the orientation of said magnetic reference device for supplying a slaving signal, means for normally supplying said slaving signal to said gyro precessing means for slaving said gyro orientation to the orientation of said magnetic device, heading selector means for supplying a signal corresponding to a desired orientation of said gyro relative to the orientation of said magnetic reference device including follow-up means coupled therewith, means for supplying said last-mentioned signal to said gyro precessing means, and means responsive to the resultant precession of said gyro for temporarily transferring said slaving signal to said follow-up means whereby to zero the signal supplied by said heading selector means.

18. An automatic pilot for controlling the azimuthal orientation of the longitudinal axis thereof through the craft control surfaces comprising a free gyroscope mounted in said craft such that the spin axis thereof is normally parallel to said craft longitudinal axis, means responsive to said gyro orientation for controlling said control surfaces such that said craft axis is maintained substantially parallel to said gyro spin axis, means for precessing said gyro spin axis whereby to change its orientation, a magnetic device for providing a heading reference through interaction with the earth's magnetic field, a first signal generator coupled with said gyro and responsive to said magnetic device for providing a first signal proportional to the orientation of said gyro relative to the orientation of said magnetic device in said earth's field, means for supplying said first signal to said gyro precessing means whereby normally to slave said gyro axis to said magnetic reference device, turn command means for supplying a second signal corresponding to a desired orientation of said craft axis including follow-up means coupled therewith, means for supplying said second signal to said gyro precessing means whereby to precess said gyro about said azimuth axis and thereby to produce a corresponding turning of said craft through said control surfaces, and means responsive to the resultant turning of said craft for transferring said first signal to said turn command follow-up means whereby to drive said follow-up means in accordance with said first signal.

19. An automatic pilot of the character set forth in claim 18 wherein said turn responsive means for transferring said first signal to said follow-up means includes means responsive to a predetermined magnitude of the turning movement of said craft, and further means responsive to a turning movement of said craft greater than said predetermined turning movement for disconnecting said first signal from said follow-up means and for simultaneously supplying said second signal to said follow-up means.

20. An automatic pilot system for aircraft having control surfaces for controlling the orientation of the craft's longitudinal axis comprising a free gyroscope supported in said craft such that its spin axis is normally substantially parallel to said craft longitudinal axis, a servo loop coupling said surfaces with said gyro for maintaining said craft axis substantially parallel with said gyro spin axis, precessing means for controlling the orientation of said gyro spin axis, pitch attitude reference means including signal producing means for providing a reference signal corresponding to the pitch attitude of said craft axis, follow-up means coupled with said signal producing means and adapted to operate in a direction to reduce said reference signal toward zero, command control means for providing a command signal corresponding to a desired change in the pitch attitude of said craft, means for supplying said command signal to said gyro precessing means whereby to precess said gyro spin axis in accordance therewith and to correspondingly change the orientation of said craft axis through said servo loop, and means responsive to said command control means for supplying said reference signal to said follow-up means whereby to maintain said reference signal substantially zero during operation of said command control means.

21. In an automatic pilot system for an aircraft having control surfaces for controlling the orientation of the longitudinal axis thereof comprising, a free gyroscope pivotally supported in said craft in a manner such that the spin axis thereof is normally parallel to the craft's longitudinal axis, servomotor means for actuating said control surfaces and means responsive to relative deviations between said craft longitudinal axis and said gyro spin axis for controlling said servomotor means in a direction and to an amount to reduce said deviations toward zero, a vertical reference device for supplying a signal upon deviations of the craft's longitudinal axis from a desired pitch attitude, a differential means at said gyro responsive to said signal for supplying said signal to said precessing means only upon relative deviations between said gyro spin axis and said desired pitch attitude of said craft.

References Cited in the file of this patent

UNITED STATES PATENTS

| | | |
|---|---|---|
| 2,444,933 | Jasperson | July 13, 1948 |
| 2,613,352 | Kellogg | Oct. 7, 1952 |
| 2,627,384 | Esval | Feb. 3, 1953 |
| 2,705,792 | Harris | Apr. 5, 1955 |
| 2,795,379 | Dowker et al. | June 11, 1957 |